(12) United States Patent
Starner et al.

(10) Patent No.: US 6,382,660 B1
(45) Date of Patent: May 7, 2002

(54) AIR BAG ASSEMBLY

(75) Inventors: Allen Richard Starner, Springboro; Craig M. Hanson; Bryan T Waid, both of Kettering, all of OH (US); James Lloyd Webber, Shelby Township; David Charles Viano, Bloomfield Hills, both of MI (US); Tomas Agren; Blair E. Carlson, both of Trollhattan (SE)

(73) Assignees: Delphi Technologies, Inc., Troy; General Motors Corporation, Detroit, both of MI (US); Saab Automobile AB (SE)

( * ) Notice: Subject to any disclaimer, the term of this patent is extended or adjusted under 35 U.S.C. 154(b) by 0 days.

(21) Appl. No.: 09/545,880

(22) Filed: Apr. 7, 2000

(51) Int. Cl.[7] .............................................. B60R 21/22
(52) U.S. Cl. .................................. 280/728.2; 280/730.2
(58) Field of Search ........................... 280/728.2, 728.3, 280/730.1, 730.2

(56) References Cited

U.S. PATENT DOCUMENTS

| | | | | |
|---|---|---|---|---|
| 3,897,961 A | * | 8/1975 | Leising et al. ............ | 280/730.1 |
| 3,922,002 A | * | 11/1975 | Lindbert et al. ............ | 180/274 |
| 5,482,315 A | * | 1/1996 | Chandler et al. ......... | 280/730.1 |
| 5,605,346 A | * | 2/1997 | Cheung et al. | |
| 5,884,937 A | * | 3/1999 | Yamada ................... | 280/730.2 |
| 5,938,233 A | * | 8/1999 | Specht ..................... | 280/730.2 |
| 6,106,006 A | * | 8/2000 | Bowers et al. ............ | 280/730.2 |
| 6,152,485 A | * | 11/2000 | Kato ............................. | 280/749 |
| 6,155,594 A | * | 12/2000 | Ibe et al. ................... | 280/728.2 |
| 6,173,990 B1 | * | 1/2001 | Nakajima et al. ......... | 280/730.2 |
| 6,176,513 B1 | * | 1/2001 | Neidert ....................... | 280/729 |

FOREIGN PATENT DOCUMENTS

DE    19955023 A1    11/1999

* cited by examiner

Primary Examiner—Paul N. Dickson
(74) Attorney, Agent, or Firm—Kathryn A. Marra

(57) ABSTRACT

This present invention provides an air bag assembly for use in a vehicle having a front structural member which preferably comprises an A-pillar of the vehicle. The air bag assembly comprises an inflator for generating gas and an air bag cushion deployable upon generation of gas by the inflator. The air bag cushion is preferably stored along a length of the front structural member while the inflator is preferably located at a position remote from the front structural member. The air bag assembly further includes a gas conduit which provides a gas path for transferring the gas from the inflator to the air bag cushion. The gas conduit comprises an expandable member extending along at least a length of the front structural member which permits the gas conduit to be packaged within the A-pillar structure underneath interior trim molding used to cover the A-pillar.

34 Claims, 4 Drawing Sheets

AIR BAG ASSEMBLY

TECHNICAL FIELD

The present invention relates generally to vehicle supplemental inflatable restraint systems and, more particularly, to an air bag assembly having at least one air bag disposed along a front structural member, e.g., a pillar, of the vehicle, wherein the inflator gases are transferred along the front structural member to the at least one air bag.

BACKGROUND OF THE INVENTION

Driver side or passenger side supplemental inflatable restraint (SIR) systems typically include an air bag stored in a housing module within the interior of the vehicle in close proximity to either the driver or one or more passengers. SIR systems are designed to actuate upon sudden deceleration so as to rapidly deploy an air bag to restrain the movement of the driver or passengers. During deployment, gas is emitted rapidly from an inflator into the air bag to expand it to a fully inflated state.

Air bag passive restraint systems include an inflator, which produces gas to inflate the air bag cushion. Known inflators for air bag modules are generally of three types. One type is the pure gas inflator wherein a pressure vessel contains stored pressurized gas. The pressure vessel communicates with the cushion through various types of rupturable outlets or diaphragms. Another type is the gas generator wherein a propellant is ignited and the resultant gas flows through an outlet to the cushion. A third type is the hybrid or augmented type. This type includes a pressure vessel containing stored pressurized gas and a gas generator. When the generator is ignited, the resultant gas flows with the stored gas to the cushion through the pressure vessel outlet.

Typically, the inflator is stored within an air bag module which acts as a housing for the inflator and may further include a cushion pack which includes the air bag cushion to be deployed under predetermined deployment conditions. Various mounting locations have been proposed for the air bag assembly; however, the conventional means for generating the inflator gas is generally disposed proximate or adjacent the air bag cushion.

SUMMARY OF THE INVENTION

This invention offers advantages and alternatives over the prior art by providing an air bag assembly for use in a vehicle having a front structural member which preferably comprises an A-pillar of the vehicle. The air bag assembly comprises an inflator for generating gas and an air bag cushion deployable upon generation of gas by the inflator. The air bag cushion is preferably stored along a length of the front structural member while the inflator is preferably located at a position remote from the front structural member. The air bag assembly further includes a gas conduit providing a gas path for transferring the gas from the inflator to the air bag cushion. The gas conduit comprises an expandable member extending along at least a length of the front structural member to the air bag cushion.

In one embodiment, the air bag assembly further includes a plenum which surrounds a portion of the inflator so that the discharged inflator gas exiting the inflator is contained within the plenum. The plenum directs the discharged inflator gas to an outlet formed therein and which is in fluid communication with one end of the gas conduit. The plenum thus serves to focus the discharged inflator gas to a single outlet.

According to the present invention, the gas conduit is designed to retain the inflator gas under the high pressures created during an inflation event as well as be resistant to the elevated gas temperatures of the inflation gas. The gas conduit must also package in a small enough volume to allow A-pillar trim molding to cover the air bag cushion but not interfere with occupant or driver vision. Accordingly, in one embodiment, the gas conduit comprises a compressable yet expandable fluid carrying member which is disposed underneath the A-pillar molding and in fluid communication with the air bag cushion. The gas conduit may either be disposed external to the structure forming the A-pillar or the gas conduit may be incorporated into the A-pillar structure. Typically, the A-pillar is formed of a number of metal sheets, e.g., inner, middle, and outer sheets and in this instance, the gas conduit is disposed between any two of the metal sheets and preferably between the inner and middle metal sheets so long as the gas conduit is permitted to expand as the discharged inflator gas travels within the gas conduit towards the air bag cushion. The air bag cushion is preferably disposed between the trim molding and the A-pillar structure. For example, the air bag cushion may be disposed along the A-pillar between the trim molding and the inner metal sheet. While the inner, middle, and outer sheets have been discussed as being formed of a metal material, it will be appreciated that other suitable structural materials may be used.

There are a variety of suitable gas conduits which may be used according to the present invention. For example, the gas conduit may be formed of fabric which is commonly used to manufacture air bag cushions. This type of fabric provides the desired performance characteristics and also is easily pressed to a flattened state for packaging the gas conduit. During a deployment event, the fabric gas conduit will expand only as needed during the event due to the inflator gas flowing therethrough. The gas conduit may also be formed of a compressable/expandable polymer-based material such as an elastomeric or rubberized fluid carrying member, i.e., rubber hosing. In another embodiment, the gas conduit is formed of a fiber-reinforced polymeric material, e.g., an elastomeric fire hose, which is sufficient to retain pressure and also be packaged in a flattened state in the pre-deployment condition. Fiber-reinforced polymeric materials are available in a variety of types, where each type has its own different heat and pressure capabilities. The gas conduit may also be formed of a compressable/expandable metal member. In yet another embodiment, the gas conduit is formed from standard tubing of a suitable size to contain the inflation gas pressure. The tubing also has a suitable ductility which permits the tubing to be crushable to a flattened member in the pre-deployment state. Thus, the tubing is pressed to the flattened state so that the part of the tube packaged within the A-pillar lies flat. The tubing would re-expand during a deployment event allowing gas to move along its length.

In another embodiment, the A-pillar structure itself is used as the gas conduit for transferring the discharged inflator gas from the inflator/plenum to the air bag cushion. The A-pillar may be formed according to a hydroform process in which the A-pillar structure includes a single hollow member with no seams present (hereinafter referred to as a hydroform member). The A-pillar structure further includes other structural member which are disposed about the hydroform member. For example, the A-pillar structure may include the inner, middle, and outer metal sheets, along with the trim molding and in one exemplary embodiment, the hydroform member is disposed between the outer metal sheet and the middle metal sheet with the air bag cushion being disposed between the trim molding and the inner metal sheet. Thus, a channel is formed through the A-pillar by the hydroform member and it is this channel which carries the inflator gas along the length of the A-pillar. The A-pillar structure has a predetermined number of vent ports which provides outlets for the inflator gas to flow through and into the air bag cushion which is preferably disposed exterior to the A-pillar structure but in direct fluid communication therewith. The present invention advantageously permits the greater use of air bag assemblies which are designed to be disposed along the A-pillar itself by providing a gas path which is positioned within the A-pillar area. This advantageously provides an air bag assembly which has minimal impact on vision obstruction. In addition, the air bag cushion may fit into existing pillar design considerations and designs. Also by being able to remove air bags from the instrument panel and/or the steering wheel, styling freedom and simplicity for the vehicle interior are gained.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example only, with reference to the accompanying drawing in which.

DETAILED DESCRIPTION OF THE INVENTION

Figure 1:
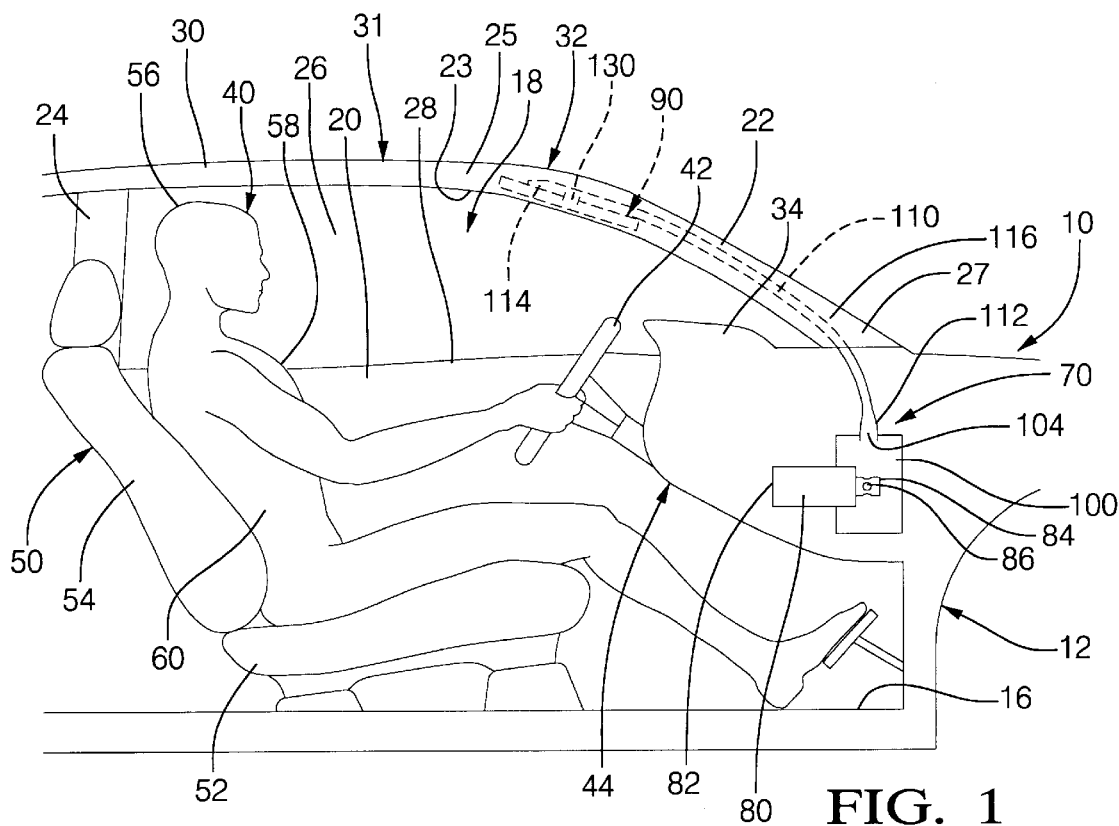
FIG. 1 is a side view of a vehicle interior partially broken-away and including an air bag assembly according to the present invention in an undeployed condition.

Referring to the FIG. 1, a vehicle is generally indicated at 10. The vehicle 10 includes a vehicle body 12 forming an occupant compartment 14. The vehicle body 12 includes a floorpan 16 and a vehicle interior 18. The vehicle interior 18 has front doors 20 positioned between front side door pillars 22 (commonly referred to as A-pillars) and rear side door pillars 24 (commonly referred to as B-pillars). Adjustable windows 26 are mounted on the front doors 20. Each front door 20 includes an inner door trim panel 28 which typically mounts a door handle and an armrest (not shown). The vehicle 10 also includes side roof rails 30 extending generally between the A-pillars 22 and the B-pillars 24. Generally located at the intersections of the roof rails 30 and the A-pillars 22, the vehicle 10 includes opposite front upper interior corners 32. It will be appreciated that the term upper interior corners 32 applies to any location in the area around the intersection of the A-pillars 22 and the roof rails 30. The vehicle 10 has a side structure 31 in which each of the side structures 31 generally includes the door 20, window 26, and roof rail 30. An instrument panel 34 is provided in the vehicle interior 18 and is more specifically spaced at a distance in front of an occupant, generally indicated at 40. A steering wheel 42 is positioned in front of the occupant 40 on a driver's side of the vehicle 10. The vehicle 10 also includes a front structure 44 which is generally defined by and includes the steering wheel 42, the instrument panel 34 and a windshield (not shown) which extends laterally between the A-pillars 22.

The vehicle interior 18 further includes seats 50 each having a lower seat bottom 52 and an upper seat back 54. Vehicle occupants 40 may be seated in one or more of the vehicle seats 50. The occupants 40 each include a head portion 56, an upper torso 58, and a lower torso 60.

Figure 10:
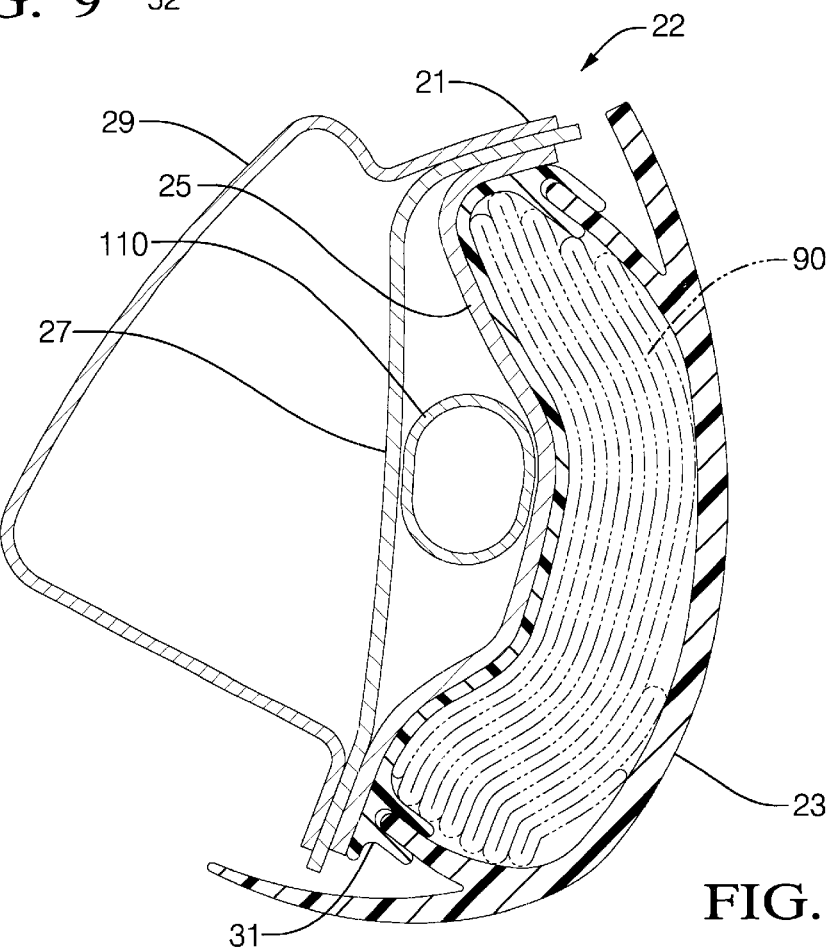
FIG. 10 is a cross-sectional top plan view showing an exemplary A-pillar construction with an air bag cushion according to the present invention.

According to the present invention, an air bag assembly 70 is mounted to the vehicle 10 and more specifically is partially disposed along the A-pillars 22. For example and according to one embodiment, the air bag assembly 70 may be disposed along the A-pillars 22 generally from the front upper interior corners 32 to an opposite lower end of the A-pillars 22 where the A-pillars 22 join the vehicle body 12. Referring now to FIGS. 1 and 10. Typically, each A-pillar 22 is formed of a plurality of structural members, generally indicated at 21 and an interior trim component 23. The plurality of structural members 21 is often times formed of a number of individual structural elements and more specifically is generally formed of a number of metal sheets. FIG. 10 illustrates one type of A-pillar 22 formed of an inner A-pillar member 25, a middle A-pillar member 27, and an outer A-pillar member 29 along with the trim component 23. Each of the inner, middle, and outer A-pillar members 25, 27, 29 is shaped according to the specific application. The inner A-pillar member 25 comprises the member which is orientated closer to the vehicle interior 18 and in this embodiment, the inner A-pillar member 25 is spaced apart from the trim component 23. The middle A-pillar member 27 is disposed between the inner and outer A-pillar members 25, 29. The trim component 23 is disposed about the plurality of structural members 21 and provides an aesthetically pleasing surface which faces the occupants 40. Typically, a trim carrier 31 is provided for coupling the interior trim 23 to the inner A-pillar member 25. The interior trim 23 may be formed from any number of materials and in one embodiment the interior trim 23 is formed of a suitable plastic material, e.g., a thermoplastic. The interior trim 23 thus preferably has a complementary shape as the structural members 21. The interior trim 23 has a first section 25 and an opposing second section 27 with the first section 25 being the end of the A-pillar 22 which joins the roof rail 30 and the second section 27 being the end which joins the remaining portion of the vehicle body 12. Often, the structural members 21 of the A-pillar 22 actually comprise a number of members which are securely attached to one another to form the A-pillar 22. If this is the case, the structural members 21 are usually welded to each other so as to form the elongated A-pillar 22.

Each air bag assembly 70 includes the basic component parts of an inflator 80 and an air bag cushion 90. As best shown in FIG. 1, the air bag cushion 90 is preferably disposed along the A-pillar 22. Depending upon the size of the air bag cushion 90 and the vehicle design, the air bag cushion 90 may be disposed along a substantial length of the A-pillar 22, e.g., from the upper interior corner 32 towards the location where the A-pillar 22 joins the vehicle body 12. Prior to deployment, each air bag cushion 90 is preferably folded and stored in some type of housing (not shown) which may simply be provided as part of the interior trim 23 covering the A-pillar 22 and roof rail 30 areas. However, it will be appreciated that the housing could alternately be provided with a separate covering, preferably of cloth or plastic, that is either mounted atop or beneath the interior trim 23. It will also be further appreciated that the air bag cushion 90 could also be stored completely or partially beneath a headliner (not shown) located in the roof of the vehicle 10 or anywhere generally within the front upper interior corner 32.

According to the present invention, the inflator 80 is disposed at a location remote from the air bag cushion 90. The precise location of the inflator 80 is not critical to the practice of the present invention and there are a number of suitable locations for the inflator 80 to be located so long as access to the A-pillar 22 is permitted from the remote location. For example, the inflator 80 could be mounted to a cross-beam structure (not shown) which forms a part of the vehicle body 12. The inflator 80 may also be incorporated within the instrument panel 34 at any number of locations including a side portion thereof. It is also within the scope of the present invention that the inflator 80 may be mounted to another structural component of the vehicle 10 including an outboard quarter panel (not shown). In the first embodiment illustrated in FIGS. 1–2, the inflator 80 is shown as being incorporated into a portion of the instrument panel 34.

The inflator 80 may be of any conventional construction which contain chemicals for generating inflator gas upon the sensing of predetermined vehicle conditions, i.e., sudden deceleration, to inflate an air bag cushion 90. The exemplary inflator 80 has a first end 82 and an opposing second end 84 with the second end 84 having a predetermined number of vent ports 86 formed therein to permit flow of the generated inflator gas therefrom during deployment conditions. The illustrated inflator 80 has a conventional structure in that the vent ports 86 are formed radially in the inflator 80 at the second end 84. Thus, the actuation of the inflator 80 causes the generated inflator gas to flow radially in a number of directions from the inflator 80.

The air bag assembly 70 further includes a plenum 100 which is attached to the inflator 80. The plenum 100 is designed to focus the radial flow of the generated inflator gas as it initially exits the vent ports 86 of the inflator 80. The plenum 100 comprises a member which receives the second end 84 of the inflator 80 at a first section thereof so that the plenum 100 surrounds the second end 84 of the inflator 80. Accordingly, once the inflator 80 is actuated and the inflator gas is generated, the flow of the inflator gas is restricted by the design of the plenum 100. More specifically, the plenum 100 contains the inflator gas flowing through the vent ports 86 and the inflator gas is focused and directed to a conduit vent 104 formed in the plenum 100.

It will be appreciated that other types of inflators may be used. For example, inflator may be of a type in which the generated inflator gas exits the inflator in a single direction from a single vent port. This type of inflator is referred to as a directional inflator. When this type of inflator is used, the plenum 100 is eliminated and the conduit 104 is in direct communication with the directional inflator so that the generated inflator gas is directed into the conduit upon actuation of the inflator.

According to the present invention, a gas conduit 110 is provided for transferring the discharging inflator gas from the plenum 100 to the air bag cushion 90. The gas conduit 110 generally has a first end 112 and an opposing second end 114 with the first end 112 being in fluid communication with either the plenum 100 surrounding the inflator 80 or the inflator 80 itself in the case where the plenum 100 is omitted. In the instance where the plenum 100 is used, the first end 112 fits over the conduit vent 104 formed in the plenum 100 and is secured to the plenum 100 so that the discharging inflator gas is focused by the plenum 100 and then flows directly through the conduit vent 104 and into the gas conduit 110. The second end 114 is in fluid communication with the air bag cushion 90 so that discharging inflator gas which travels along the length of the gas conduit 110 from the plenum 100 flows into the air bag cushion 90 for inflation thereof during deployment conditions. Furthermore, the options relating to the connection between the plenum 100 and the gas conduit 110 are maximized by allowing the gas conduit 110 to be moveable within the air bag assembly 70 area.

According to the present invention, the gas conduit 110 is designed to provide a gas path along the A-pillar 22 from the remote inflator 80 and/or plenum 100. The routing of the gas conduit 110 from the inflator 80 and/or plenum 100 to a lower portion 116 of the A-pillar 22 will vary depending upon the precise mounting location of the inflator 80/plenum 100. The gas conduit 110 then extends along at least a portion of the length of the A-pillar 22 to the air bag cushion 90. In one embodiment, the air bag cushion 90 is disposed between the structural members 21 and more specifically between the interior trim 23 and the inner A-pillar member 25. The portion of the gas conduit 110 which travels along the A-pillar 22 is likewise disposed between one of the structural members 21 and the interior trim 23 or between two of the structural members 21. In this embodiment, the interior trim 23 is designed to separate during deployment of the air bag cushion 90 as a result of the expansion of the air bag cushion 90 thereunderneath to permit proper deployment of the air bag cushion 90. Because the gas conduit 110 serves as a carrier for the discharging inflator gas, the gas conduit 110 must retain the inflator gas under the high pressures created during an inflation event as well as be resistant to the elevated temperatures of the inflator gases. The gas conduit 110 must also package in a small enough volume to allow the A-pillar trim molding 23 to cover the air bag cushion 90 but not interfere with occupant or driver vision. Thus, the gas conduit 110 comprises an expandable member which is present in a compressed state in a first position and then expands to a second position as the discharged inflator gas travels therethrough.

According to a first embodiment, the gas conduit 110 is formed of a suitable fabric material which provides the desired performance characteristics described hereinbefore. One exemplary type of fabric comprises fabrics used to construct air bag cushions. The fabric may be in either in a coated or uncoated state. The fabric material may be coated so as to better permit the gas conduit 110 to retain the inflator gas under high pressures and be resistant to the elevated temperatures of the inflator gas. One suitable coating material is a neoprene material. The fabric material should be compressable so that the gas conduit 110 may be flattened so as to be packaged underneath the interior trim 23. Advantageously, air bag type fabrics package in a very thin layer and expand only as needed during the inflation event.

In this first embodiment shown in FIG. 1, the gas conduit 110 is initially in a compressed state and is disposed within the vehicle 10 such that the first end 112 is fitted to the conduit vent 104 and the second end 114 fluidly communicates with the air bag cushion 90. More specifically, the second end 114 is in fluid communication with a mouth portion 120 of the air bag cushion 90. Thus, during a deployment event, the inflator gas is generated by the inflator 80 and flows into the plenum 100 which focuses the discharged inflator gas into the first end 112 of the gas conduit 110. The discharged inflator gas then travels within the gas conduit 110 towards the air bag cushion 90 and along the length of the A-pillar 22. As previously-mentioned, the gas conduit 110 will expand only as needed to accommodate the flow of the discharged inflator gas and therefore the expansion of the gas conduit 110 may be accommodated underneath the interior trim 23 by design of the interior trim 23.

It will be appreciated that the gas conduit 110 does not necessarily have to be directly attached to the air bag cushion 90 but instead the gas conduit 110 and more specifically, the second end 114 thereof has at least one port 130 formed therein for directing the discharged inflator gas from the gas conduit 110 to the air bag cushion 90. In this embodiment, the mouth portion 120 of the air bag cushion 90 is configured such that the at least one port 130 is in direct fluid communication therewith such that the discharged inflator gas flows through the gas conduit 110 and exits into the air bag cushion 90 through the at least one port 130. When the air bag cushion 90 is not directly attached to the gas conduit 110, the air bag cushion 90 may be secured to at least one of the gas conduit 110 and the structural member of the A-pillar 22 by any number of techniques so as to permit proper flow of the discharged inflator gas for proper inflation of the air bag cushion 90. For example, the air bag cushion 90 may be fastened down to the gas conduit 110 and/or the A-pillar 22 using a suitable fasteners, such as a clip or the like. It will be appreciated that the number, size, and shape of ports 130 will vary the flow rate of the discharged inflator gas into the air bag cushion 90. Thus, the placement of multiple ports 130 into the gas conduit 110 provides multiple points where discharged inflator gas may enter the air bag cushion 90.

Alternatively, the gas conduit 110 may be incorporated into the A-pillar 22 itself and more specifically, the gas conduit 110 may be fitted within the structural member 21 of the A-pillar 22. In this embodiment, the structural members 21 have at least one opening (not shown) which communicates with the at least one port 130 to permit the discharged inflator gas to flow from the gas conduit 110 to the air bag cushion 90 which is disposed between the interior trim 23 and the structural members 21 and preferably between the interior trim 23 and the inner A-pillar member 25. During the deployment event, the gas conduit 110 expands within the A-pillar 22 and the discharged inflator gas is delivered to the air bag cushion 90. Because the air bag cushion 90 is preferably located between the interior trim 23 and one of the structural members 21, the inflation of the air bag cushion 90 causes the interior trim 23 to separate along a seam thereof for deployment of the air bag cushion 90, as partially shown in FIG. 2.

Figure 2:
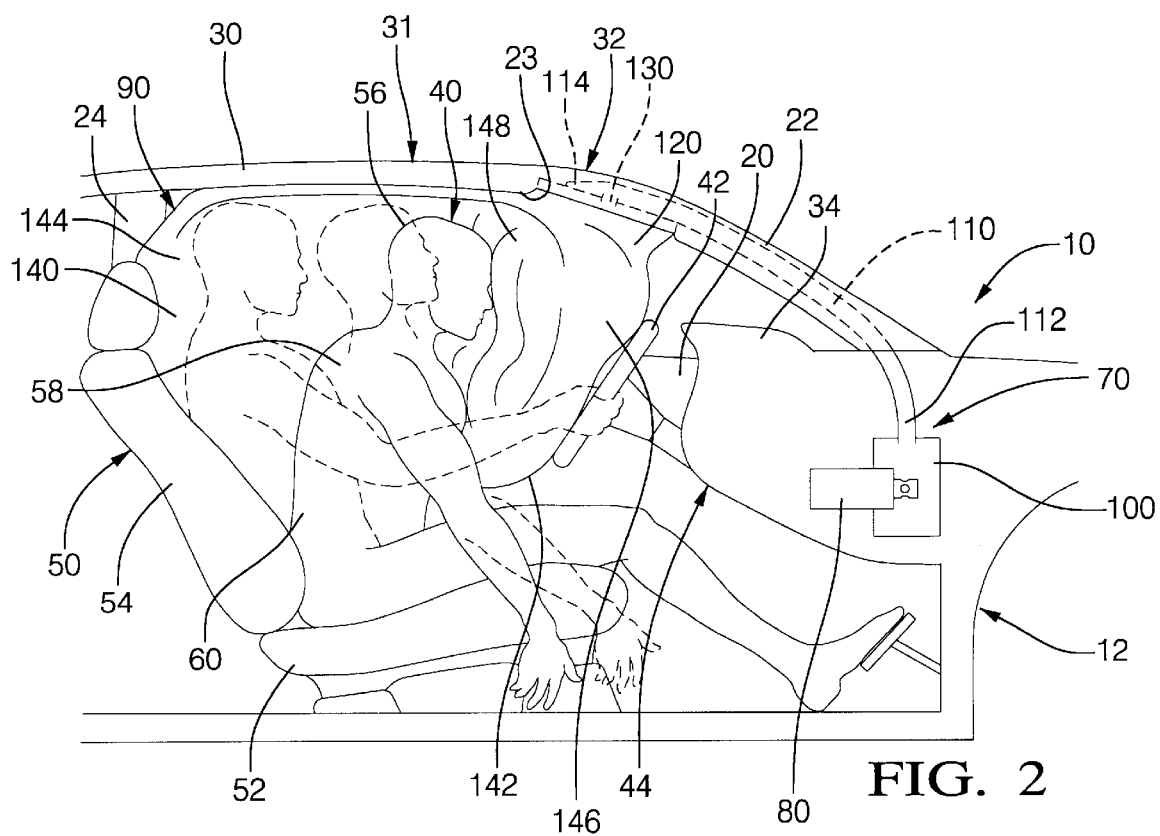
FIG. 2 is a view similar to FIG. 1, but showing the air bag assembly in a deployed condition revealing an inflated cushion.

As best shown in FIG. 2, the air bag cushion 90 is preferably made of a fabric material which is suitable for air bag 90 construction. Each air bag cushion 90 includes an inboard contact face 140 located adjacent the vehicle occupants 40 during air bag deployment, and an opposite outboard contact face 142. The air bag cushion 90 further includes a side portion 144 designed for alignment with the upper side of the vehicle occupants 40, generally at a location between the doors 20 and windows 26 of the vehicle 10 and the sides of the head portion 56 and upper torso portion 58 of each occupant 40. The air bag cushion 90 further includes a frontal portion 146 for alignment in front of the vehicle occupant 40. The front and side portions 146, 144 of the respective air bag cushion 90 are preferably integrally formed from the same sheet or sheets of fabric material and in fluid communication with each other. The frontal portion 146 of each air bag cushion 90 extends generally at 90 degrees relative to the side portion 144. A central portion 148 is formed at the intersection of the front and side portions 146, 144 and generally covers the A-pillars 22 of the vehicle 10, as will be described in greater detail hereinafter. The mouth portion 120 is in fluid communication with the second end 114 of the conduit 110 and receives discharging inflator gas therethrough.

It will be appreciated that advantageously, the air bag assemblies 70 located on the driver and passenger sides of the vehicle 10 are preferably mirror images of each other and can use the same or very similar hardware and design. This is advantageous over conventional assemblies in which the driver's air bag assembly disposed in the steering wheel 42 is completely different from the passenger side air bag assembly stored in the instrument panel 34. Thus, common parts and testing can be used for both the driver and passenger side air bag assemblies 70. Also, advantageously, common body designs can be used for the front upper interior corners 32 at the A-pillar 22 and the roof rail 30 areas on opposite sides of the vehicle 10 to eliminate the need for different manufacturing operations of these large body components. However, it will be appreciated that there may be some variations, e.g., the shape of the air bag cushion 90, to account for variations in vehicle geometry from driver to passenger side. Another advantage is that since the air bag assemblies 70 are stored along the A-pillar 22 and/or roof rail 30 areas, extensive styling freedom is enabled for the steering wheel 42 and the instrument panel 34 designs. In addition, the vehicle interior 18 may be able to provide more occupant space, especially on the passenger side of the vehicle 10. Furthermore, it will be appreciated that a single air bag assembly 70 can be used for both the upper side and frontal protection of the occupants 40, thus eliminating the need for additional inflators, sensors, housings, packaging requirements and cushions over the typical prior art arrangements.

The frontal portion 146 of the air bag cushion 90 has a volume which is preferably, but not necessarily, greater than the side portions 144 of the respective air bag cushion 90. The frontal portion 146 of the air bag cushion 90 is preferably sized and shaped to deploy between the occupants 40 and the vehicle frontal structure 44, such as the steering wheel 42 and the instrument panel 34. The frontal portions 146 thus eliminate the need for any other frontal air bags located in the steering wheel 20 or the instrument panel 34. The side portions 144 are preferably sized and shaped to deploy between the occupants 40 and the side structure 31, such as the doors 20 and the windows 26. The side portions 144 generally act as a head curtain to cover a large vertical and longitudinal area and are generally longer and taller than the front portions 146, but preferably not as deep in the lateral direction. The use of the side portions 144 eliminates the need for a separate head-curtain type air bag assembly as in the prior art.

It will be appreciated that the inflation characteristics of the air bag cushion 90 may be changed by altering the air bag assembly 70. For example, the quicker inflation of the side portion 144 may be accomplished by some combination of the side portion 144 having a lesser internal volume. In addition, the generated inflator gas may be directed more into the side portion 144 than the frontal portion 146. Furthermore, the folding of the air bag cushion 90 can also affect the inflation characteristics of the air bag cushion 90. For example, the side portions 144 of the air bag cushion 90 can be folded loosely or even unfurled along the roof rail 30, while the frontal portion 146 of the air bag cushion 90 are folded tightly, for example such as by rolling, so that the side portion 144 inflates more quickly than the frontal portion 146. In the case when the side portion 144 of the air bag cushion 90 are initially unfurled, the upper edge of the side portion 50 could also be connected to the roof rail 30 for stability of the side portion 144 of the air bag cushion 90.

It will be further appreciated that the front portion 146 and the side portion 144 of each air bag cushion 90 intersects at central portion 148 on each of the air bag cushions 90. The central portion 148 is generally aligned between the A-pillar 22 and the occupant 40 during deployment. Accordingly, the exemplary air bag cushion 90 can be useful for lateral and longitudinal deceleration and certain combinations thereof. Advantageously, the single combination frontal and side air bag assembly 70 provides continuous and uninterrupted coverage of the front and side structures 146, 144 and wrap around each occupant 40. It being understood that the above-described air bag cushion 90 is merely exemplary and illustrative in nature and is it within the scope of the present invention that other air bag cushions 90 may be used.

Figure 3:
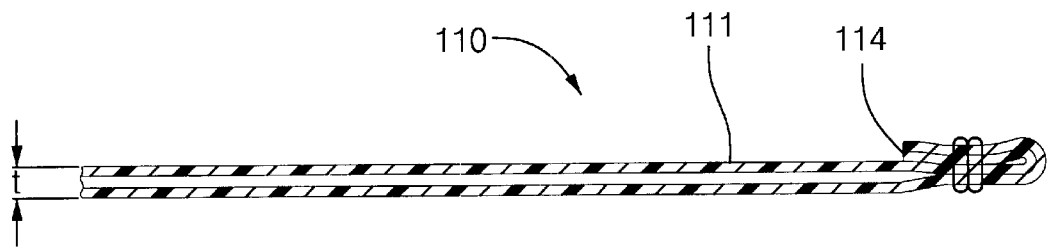
FIG. 3 is a side cross-sectional view of a gas conduit according to a first embodiment of the present invention in a non-deployed state.
Figure 4:
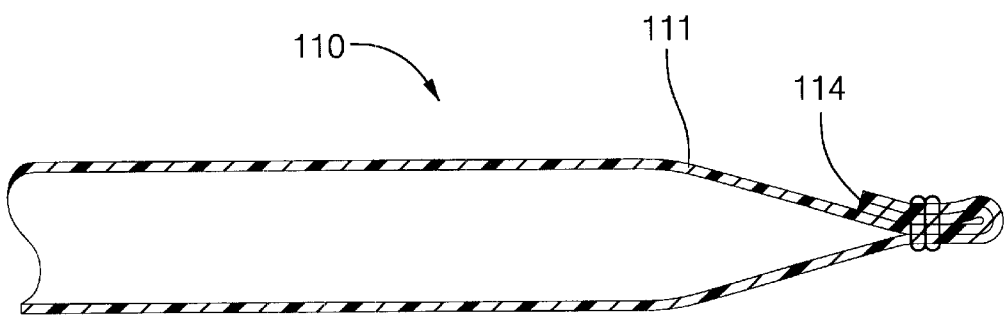
FIG. 4 is a side cross-sectional view of the gas conduit according to FIG. 3 in a deployed state.

Referring now to FIGS. 1–4. In another embodiment of the present invention, the gas conduit 110 is formed of a fiber-reinforced material. In one exemplary embodiment, the fiber-reinforced material comprises a fire hose material. The fiber-reinforced polymeric material provides a suitable gas conduit material in that the material is sufficient to retain pressure and can also package in a flattened state in the pre-deployment condition. Fiber-reinforced polymeric materials, such as fire hose material, are commonly available in a variety of types each having different heat and pressure capabilities. FIG. 3 shows one type of fire hose material in a non-deployed condition and FIG. 4 shows the fire hose material in a deployed condition. In one exemplary embodiment, the fiber-reinforced polymeric material comprises a fire hose material which forms the gas conduit 110 and has an outer wall 111 and in the illustrated embodiment, the second end 114 is folded over and sealed so that second end 114 represents a sealed end. In the undeployed condition, the outer wall 111 is compressed into a flattened state in which the flattened fire hose material has a predetermined thickness, generally indicated as t. The thickness t will vary according to the type of fire hose material used; however, the thickness t is such that the fire hose material in the flattened state may be disposed either between the interior trim 23 and the inner A-pillar member 25 (shown in FIG. 10) of the A-pillar 22 or within the A-pillar 22 as previously discussed. During deployment conditions, the discharged inflator gas flows within the gas conduit 110 causing the gas conduit 110 to expand, as is shown in FIG. 4.

As with the first embodiment of the present invention, the gas conduit 110 formed of fire hose material may be disposed either between the A-pillar 22 and the interior trim 23 or it may be incorporated into the structural members 21 forming the A-pillar 22. Either location is suitable because the first hose material may be packaged in a flattened condition in the undeployed state. In either embodiment, the fire hose material travels a predetermined length of the A-pillar 22 and communicates with the air bag cushion 90 which is likewise preferably disposed along a length of the A-pillar 22.

Figure 5:
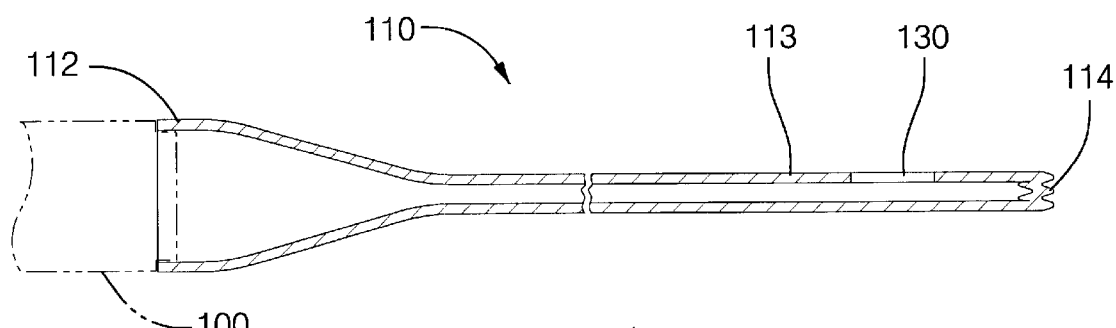
FIG. 5 is a side cross-sectional view of a gas conduit according to a second embodiment of the present invention in an undeployed condition.
Figure 6:
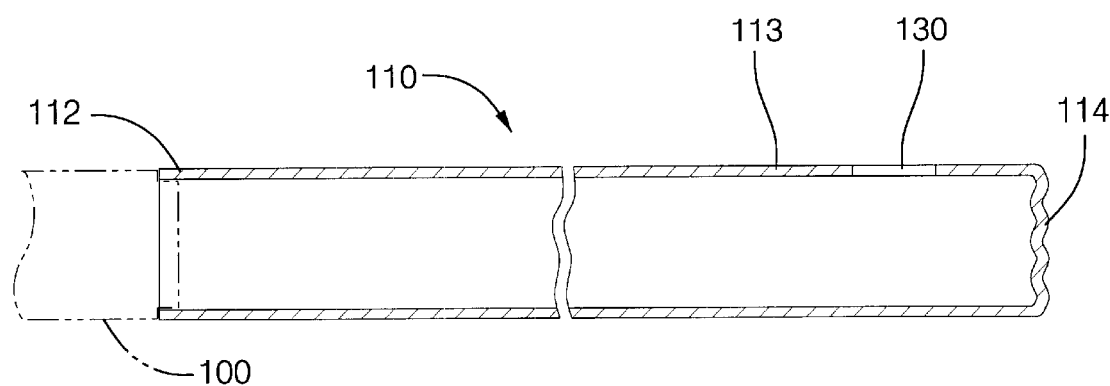
FIG. 6 is a side cross-sectional view of the gas conduit of FIG. 2 in an deployed condition.

Referring now to FIGS. 5–6 in which another embodiment of the gas conduit 110 is shown. In this embodiment, the gas conduit 110 is formed of an expandable elongated metal conduit. FIG. 5 shows the expandable metal conduit in an undeployed condition and FIG. 6 shows the member in a deployed condition. The first end 112 of the metal conduit forming the gas conduit 110 is fitted to the plenum 100 so that fluid communication between the inflator 80 (shown in FIG. 1) and the air bag cushion 90 (shown in FIG. 1) is permitted. In this embodiment, the second end 114 comprises an end formed of compressed metal and represents a sealed end of the gas conduit 110. As the discharged inflator gas flows into the gas conduit 110, an outer wall 113 of the metal conduit 110 expands and the compressed second end 114 likewise expands to the deployed position shown in FIG. 6. FIG. 6 also illustrates one port 130 which is formed in the metal conduit and is designed to permit the discharged inflator gas to flow from the metal conduit 110 and into the air bag cushion 90 (FIG. 1). The air bag cushion 90 may be orientated so that the mouth portion 120 (shown in FIG. 2) communicates with the port 130.

One suitable metal gas conduit 110 comprises standard tubing of a suitable size to contain the inflation gas pressure and suitable ductility which permits the metal gas conduit 110 to be crushable. The tubing is pressed to a flattened state (FIG. 5) so that the section of the gas conduit 110 which is packaged within the A-pillar 22 lies flat. The tubing re-expands during a deployment event allowing gas to move along the length thereof. It will be appreciated that when the gas conduit 110 is in the form of a metal conduit, the gas conduit 110 maybe disposed along the length of the A-pillar 22 between the A-pillar 22 and the interior trim 23 or the gas conduit 110 may be incorporated into the A-pillar 22 itself (e.g., within the structural members 21) so long as there is the necessary room for expansion of the gas conduit 110 during deployment conditions. In either case, the air bag cushion 90 is positioned between the A-pillar 22 and the interior trim 23.

It will also be appreciated that the gas conduit 110 may be formed of a compressable/expandable polymer-based material which is suitable for the application conditions of the present invention. One type of gas conduit 110 comprises a rubberized hose or tube which can carry the inflator gas in a channel extending therethrough while at the same time be packaged in a flattened state.

Figure 7:
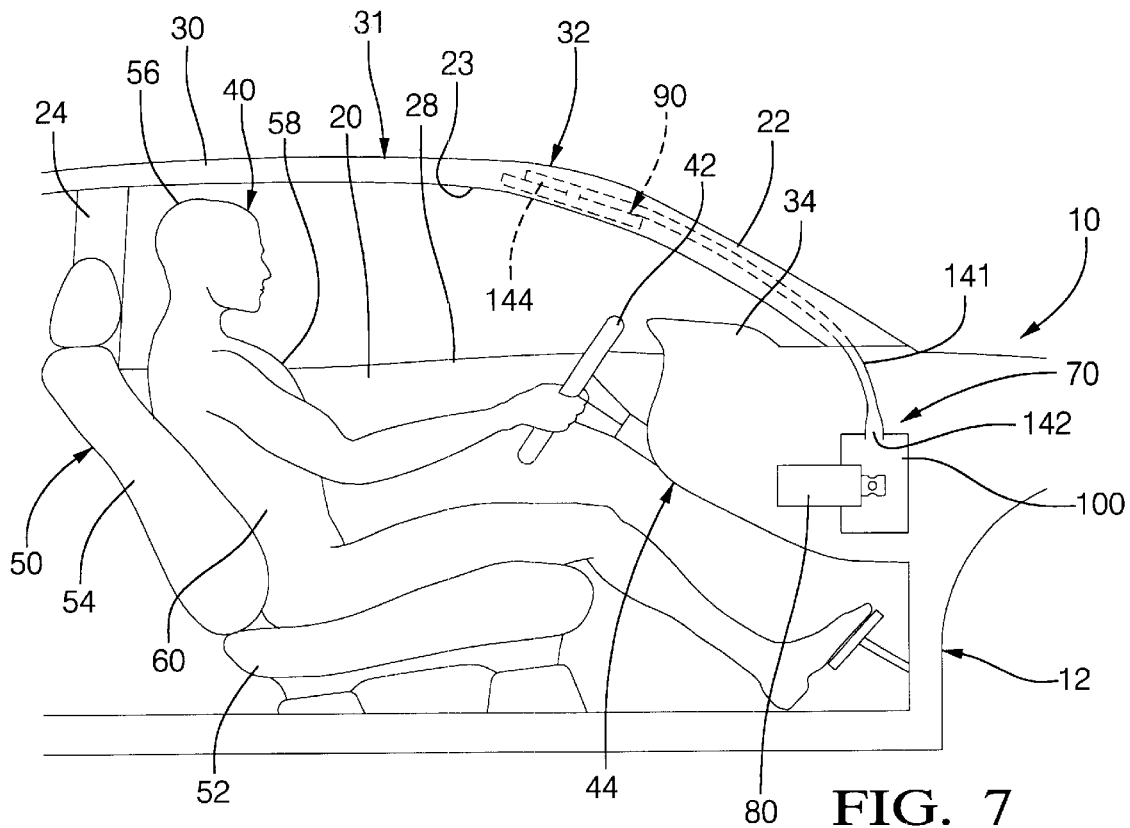
FIG. 7 is a side view of a vehicle interior partially broken-away and including an air bag assembly according to the present invention in an undeployed condition.

Now referring to FIGS. 7 and 10. In yet another embodiment of the present invention, the discharged inflator gas is delivered from the inflator 80 and/or plenum 100 to the air bag cushion 90 using a rigid, elongated conduit member 141 which is designed to retain the discharged inflator gas under the high pressures created during an inflation event as well as be resistant to the elevated gas temperatures of the inflation gases. One exemplary conduit member 141 comprises a rigid pipe which is disposed along the A-pillar 22 for transferring discharged inflator gas to the air bag cushion 90. In one embodiment, the conduit member 141 is coupled to one of the structural members 21 of the A-pillar 22 and is disposed underneath the interior trim 23. A first end 142 of the conduit member 140 is attached in fluid communication to the plenum 100 or the inflator 80 when the plenum 100 is not used and a second end 144 is in fluid communication with the air bag cushion 90 which is disposed underneath the interior trim 23. As with the other embodiments, the second end 144 of the conduit member 140 may include one or more ports 130 for directing the inflator gas into the air bag cushion 90. It will also be appreciated that the conduit member 140 may also be incorporated within the structural member of the A-pillar 22. For example, the A-pillar 22 often is formed of inner A-pillar sheet 25 and middle A-pillar sheet 27, and the conduit member 140 is disposed therebetween. In this embodiment, the air bag cushion 90 lies between the interior trim 23 and the inner A-pillar sheet 25. In this embodiment, the inner A-pillar sheet 25 has at least one opening which is designed to permit the discharged inflator gas to flow from the conduit member 140 to the air bag cushion 90. As with the other embodiments, the air bag cushion 90 is preferably disposed along a length of the A-pillar 22 and between the interior trim 23 and the inner A-pillar sheet 25 of the A-pillar 22.

Figure 8:
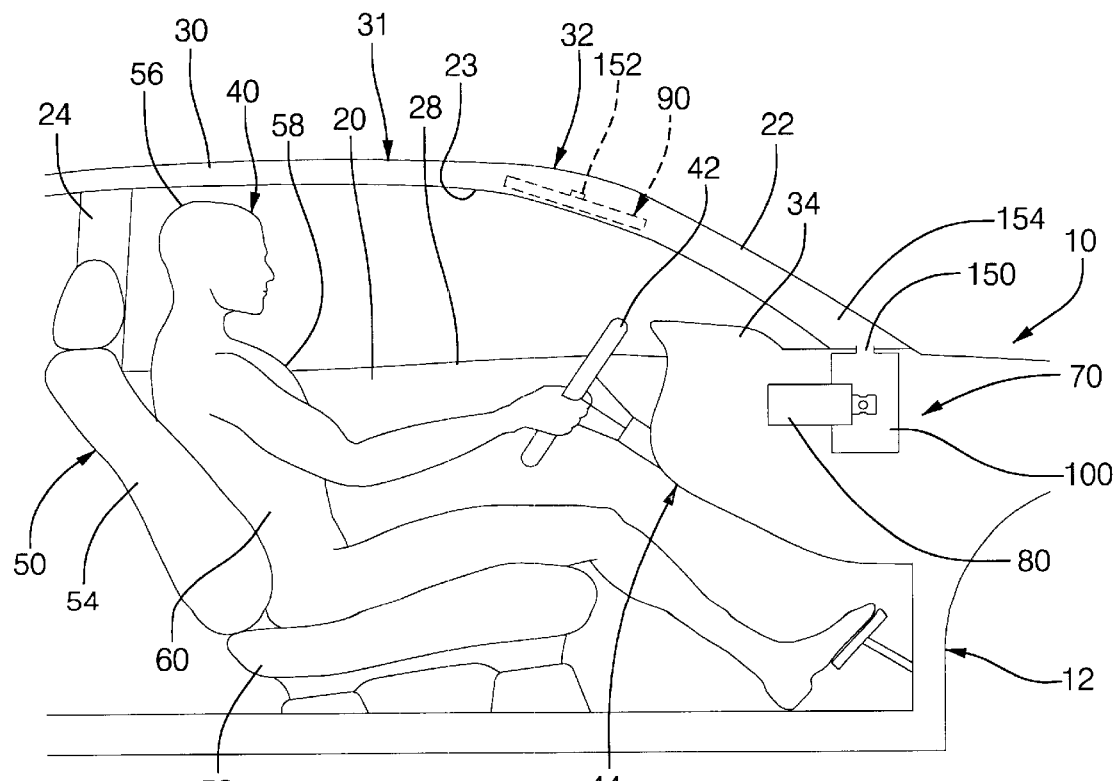
FIG. 8 is a side view of a vehicle interior partially broken-away and including an air bag assembly according to the present invention in an undeployed condition.

Now referring to FIG. 8 in which another embodiment of the present invention is illustrated. In this embodiment, the discharged inflator gas is transferred using an existing structural component of the vehicle body 12. More specifically, the A-pillar 22 structure itself is used to transfer the discharged inflator gas from the inflator 80/plenum 100 to the air bag cushion 90. Some vehicles 10 include a hydroformed structure, in this case the A-pillar 22, which is used to maintain the structural loading of the A-pillar 22. When a hydroform process is used to form the A-pillar 22, as shown in FIG. 8, the A-pillar 22 comprises a single hollow member with no seams present. Thus, the hollow center portion of the A-pillar 22 serves as the gas conduit 110. The A-pillar 22 therefore is designed to include a first port 150 which is in fluid communication with the plenum 100 so that the discharged inflator gas flows through the A-pillar 22 and exits therefrom at a second port 152 which is in communication with the air bag cushion 90. In this embodiment, the A-pillar 22 is designed to retain the discharged inflator gas under high pressures created during an inflation event as well as be resistant to the elevated temperatures of the discharged inflator gases.

Under deployment conditions, the inflator gas is generated and flows through the plenum 100 and into the A-pillar 22 where it then travels along the length of the A-pillar 22 until the pressurized inflator gas reaches the second port 152. The discharged inflator gas then flows through the first port 150, which represents a path of lower resistance, and into the air bag cushion 90 for inflation thereof As with the other embodiments of the present invention, the air bag cushion 90 is disposed along the length of the A-pillar 22 and in one exemplary embodiment is disposed underneath the interior trim 23. Advantageously, the use of an existing structural member (the A-pillar 22) as a means for transferring discharged inflator gas reduces the number of parts which are needed for the air bag assembly 70 of the present invention because a separate gas conduit member is not required. If the inflator 80/plenum 100 are not disposed adjacent or close to a lower portion 154 of the A-pillar 22, then a gas conduit connector (not shown) may be used to fluidly connect the inflator 80/plenum 100 and the A-pillar 22 which serves as the gas conduit. The gas conduit connector may be formed of any of the materials previously mentioned with reference to the construction of the gas conduit 110 (FIG. 1) of the resent invention.

Figure 9:
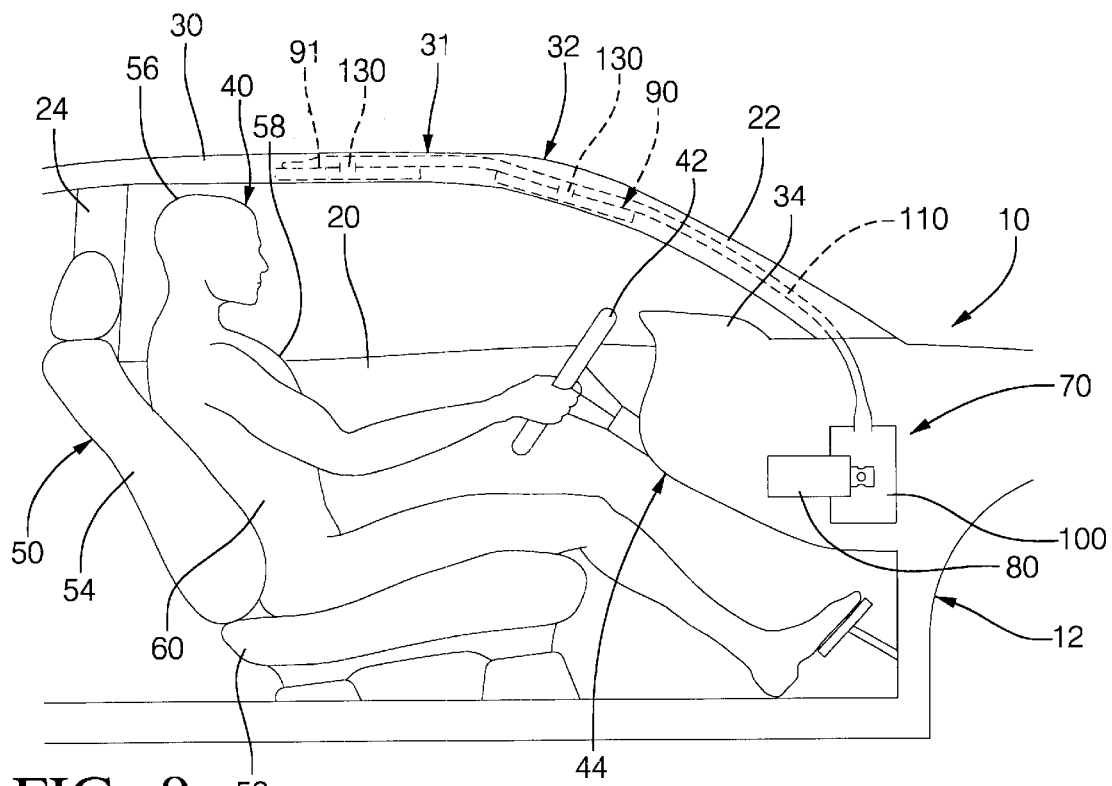
FIG. 9 is a side view of a vehicle interior partially broken-away and including an air bag assembly according to another embodiment of the present invention in an undeployed condition.

FIG. 9 illustrates yet another embodiment according to the present invention. In this embodiment, a second air bag cushion 91 is provided and disposed generally within the vehicle interior 18. The exemplary second air bag cushion 91 is disposed along the roof rail 30. The second air bag cushion 91 is preferably disposed proximate the air bag cushion 90 and is in fluid communication with the gas conduit 110 so that the discharged inflator gas flowing through the gas conduit 110 inflates both the air bag cushion 90 and the second air bag cushion 91. Accordingly, a predetermined number of vent ports 130 are formed in the gas conduit 110 so as to provide a means for inflating the air bag cushion 90 and the second air bag cushion 91. In the illustrated embodiment, the second air bag cushion 91 is disposed underneath a head liner 133 of the vehicle 10. The flow rate of the discharged inflator gas may be varied by changing the number, shape, size, or a combination thereof of each vent port 130. For example and as shown in FIG. 9, the air bag cushion 90 is in closer proximity to the inflator 80 and therefore the discharged inflator gas flowing within the gas conduit 110 first encounters the vent port(s) 130 which fluidly communicate with the air bag cushion 90. The air bag cushion 90 will begin to be inflated; however, flow resistance (pressure build-up) is created because the inflator gas must travel through these vent port(s) 130 and this results in the inflator gas continuing to flow within the gas conduit 110 to the other vent port(s) 130 which fluidly communicates with the second air bag cushion 91 for inflation thereof. It will be appreciated that the respective inflation rates of both the air bag cushion 90 and the second air bag cushion 91 can be adjusted and selected depending upon the given application by simply designing the vent ports 130 to provide the desired inflation characteristics. It will also be appreciated that the second air bag 91 does not necessarily have to be of a head-curtain type air bag but may comprise any number of types of air bags and the precise placement location for the second air bag 91 may also be varied. For example, the second air bag 91 may be generally placed at the front upper interior corner 32 of the vehicle 10 or placed along the length of the A-pillar 22.

Referring to FIGS. 1–9. According to the present invention and upon the vehicle 10 experiencing certain predetermined conditions, a vehicle sensor (not shown) detects conditions for air bag deployment. A controller (not shown), e.g., a sensing and actuating system, generates an ignition signal to the inflator 80 in response to velocity responsive sensors (not shown) mounted in the vehicle bumper and/or acceleration, or inertia responsive sensors mounted on a part of the vehicle occupant compartment, such as a fire wall. The sensor may also comprise another type of sensor, such as omni-directional or tri-axial sensors which refer to algorithms that decide where and when to direct the inflation gas. Also, the total number of sensors for side and front deployment may also be reduced using this type of air bag assembly 70. Preferably, the sensing takes about 6 milliseconds (ms), similar to typical side sensors. It being understood that the sensing time period may vary according to the precise application. One each side of the vehicle 10, the inflator 80 generates the necessary amount of inflator gas which is discharged into the mouth portions 120 of the air bag cushions 90 (and optionally the second air bag cushions 91) to inflate these air bag cushions. The force of the deploying air bags 90, 91 causes any housing surrounding each air bag to separate and in addition, the interior trim 23 likewise will separate due to the deploying air bag. The exemplary air bag cushion 90 described herein is designed so that the side and frontal portions 144, 146 deploy in downward directions as they inflate. Upon inflation, the side portions 144 are positioned adjacent the head portions 56 and upper torso portions 58 of the occupants 40 and the side structures 31 of the vehicle 10. The frontal portions 146 are positioned in front of the occupants 40 between the front structure 44 and the occupants 40. The central A-pillar portions 148 of the air bag cushions 90 are positioned between the occupants 40 and the A-pillars 22 and provide a continuous connection between the front and side portions 146, 144. Thus, the air bags 90 generally wrap around the occupants 40. In one embodiment, the side portions 144 are initially filled with inflator gas prior to the frontal portions 146 and are fully inflated within a first time period from sensing. Then the frontal portions 146 become fully inflated within a second time period from sensing. In one embodiment, the first time period is shorter than the second time period; however, it will be understood that the timing of the deployment of the air bag cushion 90 can be tuned according to vehicle application. It will be appreciated that this is only one illustrative type of air bag cushion 90 that may be used according to the present invention.

Thus, the present invention offers an air bag assembly 70 which teaches having the inflator 80 at a remote location relative to the air bag cushion 90, wherein the generated inflator gas is transferred from the inflator 80 to the air bag cushion 90 along the A-pillar 22 by means of the gas conduit 110 according to the present invention. The present invention permits the placement of the gas path outside the pillar sheet metal but underneath the interior trim 23. This ensures serviceability with relative ease when necessary. The present invention also permits placement of the gas path within the pillar area itself and this advantageously provides an air bag assembly which has minimal impact on vision obstruction. In addition, the air bag cushion 90 may fit into existing pillar design considerations and designs. Furthermore, the options relating to the connection between the plenum 100 and the gas conduit 110 are maximized by allowing the gas conduit 110 to be moveable within an assembly area. Also by being able to remove air bags from the instrument panel 34 and/or the steering wheel 42, styling freedom and simplicity for the vehicle interior 18 are gained.

It will be understood that a person skilled in the art may make modifications to the preferred embodiment shown herein within the scope and intent of the claims. While the present invention has been described as carried out in a specific embodiment thereof, it is not intended to be limited thereby but is intended to cover the invention broadly within the scope and spirit of the claims.

What is claimed is:

1. An air bag assembly in a vehicle having a front structural member, the assembly comprising:
   an inflator for generating gas;
   an air bag cushion deployable upon generation of gas by the inflator; and
   a gas conduit providing a gas path for transferring the gas from the inflator to the air bag cushion, the gas conduit comprising an expandable member extending along at least a length of the front structural member,
   wherein the front structural member comprises an A-pillar formed of inner, middle, and outer A-pillar sheets and an interior trim disposed thereabout, the air bag cushion being disposed between the inner A-pillar sheet and the interior trim.

2. The air bag assembly as set forth in claim 1, wherein the inflator is disposed in a location remote from the front structural member.

3. The air bag assembly as set forth in claim 2, wherein the vehicle includes: an instrument panel, the inflator being stored within a section of the instrument panel.

4. The air bag assembly as set forth in claim 1, wherein the air bag cushion is stored in an upper front interior corner of the vehicle, the upper front interior corner being defined by the front structural member and a roof rail.

5. The air bag cushion assembly as set forth in claim 1, wherein the air bag cushion is disposed along a length of the front structural member.

6. The air bag assembly as set forth in claim 1, wherein the air bag cushion includes a frontal portion and a side portion, the frontal portion and the side portion being in fluid communication with each other, whereby upon air bag deployment, the frontal portion deploys downwardly and in front of a vehicle occupant and wherein the side portion deploys downwardly and to the side of the vehicle occupant such that the air bag cushion wraps around the occupant during deployment for continuous front to side coverage.

7. The air bag assembly as set forth in claim 1, wherein the gas conduit is formed of an expandable material, wherein in a first state the gas conduit is compressed to a generally flattened state and upon inflator gas flowing therethrough, the gas conduit expands to a second state.

8. The air bag assembly as set forth in claim 1, wherein the gas conduit is selected from the group consisting of air bag cushion fabric conduits, coated air bag cushion fabric conduits, fire hose material conduits, compressable and expandable elongated metal conduits, rigid conduits and compressable and expandable polymer-based conduits.

9. The air bag assembly as set forth in claim 1, wherein the gas conduit is disposed between the inner and middle A-pillar sheets.

10. The air bag assembly as set forth in claim 1, wherein the gas conduit is disposed between the inner A-pillar sheet and the air bag cushion.

11. The air bag assembly as set forth in claim 1, wherein the gas conduit is disposed between the middle A-pillar sheet and the outer A-pillar sheet.

12. The air bag assembly as set forth in claim 1, wherein the gas conduit has a first end in fluid communication with the inflator and a second end in fluid communication with the air bag cushion so that generated inflator gas flows into the first end and flows through the gas conduit and into the air bag cushion.

13. An air bag assembly in a vehicle having a front structural member, the assembly comprising:
    an inflator for generating gas;
    an air bag cushion deployable upon generation of gas by the inflator;
    a gas conduit providing a gas path for transferring the gas from the inflator to the air bag cushion, the gas conduit comprising an expandable member extending along at least a length of the front structural member; and
    a plenum surrounding the inflator for containing the generated inflator gas and directing the inflator gas to an outlet formed therein, the outlet being in fluid communication with the gas conduit so that the inflator gas flows through the outlet and into the gas conduit.

14. The air bag assembly as set forth in claim 13, wherein the inflator is disposed in a location remote from the front structural member.

15. The air bag assembly as set forth in claim 14, wherein the vehicle includes:
    an instrument panel, the inflator being stored within a section of the instrument panel.

16. The air bag assembly as set forth in claim 13, wherein the front structural member comprises an A-pillar formed of inner, middle, and outer A-pillar sheets and an interior trim disposed thereabout.

17. The air bag assembly as set forth in claim 16, wherein the gas conduit is disposed between the inner and outer A-pillar sheets and the air bag cushion is disposed between the inner A-pillar sheet and the interior trim.

18. The air bag assembly as set forth in claim 17, wherein the gas conduit is formed of an expandable material, wherein in a first state the gas conduit is compressed to a generally flattened state and upon inflator gas flowing therethrough, the gas conduit expands to a second state corresponding to an area defined between the inner and outer A-pillar sheets.

19. The air bag assembly as set forth in claim 18, wherein the gas conduit is selected from the group consisting of air bag cushion fabric conduits, coated air bag cushion fabric conduits, fire hose material conduits, compressable and expandable elongated metal conduits, rigid conduits, and compressable and expandable polymer-based conduits.

20. The air bag assembly as set forth in claim 13, wherein the air bag cushion is stored in an upper front interior corner of the vehicle, the upper front interior corner being defined by the front structural member and a roof rail.

21. The air bag cushion assembly as set forth in claim 13, wherein the air bag cushion is disposed along a length of the front structural member.

22. The air bag assembly as set forth in claim 13, wherein the air bag cushion includes a frontal portion and a side portion, the frontal portion and the side portion being in fluid communication with each other, whereby upon air bag deployment, the frontal portion deploys downwardly and in front of a vehicle occupant and wherein the side portion deploys downwardly and to the side of the vehicle occupant such that the air bag cushion wraps around the occupant during deployment for continuous front to side coverage.

23. The air bag assembly as set forth in claim 13, wherein the gas conduit has a first end in fluid communication with the inflator and a second end in fluid communication with the air bag cushion so that generated inflator gas flows into the first end and flows through the gas conduit and into the air bag cushion.

24. An air bag assembly in a vehicle having a structural member including an inner and outer pillar sheets and an interior trim disposed thereabout, the assembly comprising:

an inflator for generating gas;

an air bag cushion deployable upon generation of gas by the inflator; and a gas conduit providing a gas path for transferring the gas from the inflator to the air bag cushion, the gas conduit comprising a member which in a first condition is in a compressed state, the gas conduit being disposed between the inner and outer pillar sheets and extending along at least a length of the structural member so that upon actuation of the inflator, the inflator gas flows through the gas conduit causing expansion thereof and causing the gas conduit to generally assume a cross-section corresponding to an area defined between the inner and outer pillar sheets.

25. The air bag assembly as set forth in claim 23, wherein the inflator is disposed in a location remote from the structural member.

26. The air bag assembly as set forth in claim 25, wherein the vehicle includes:

an instrument panel, the inflator being stored within a section of the instrument panel.

27. The air bag assembly as set forth in claim 24, wherein the structural member is selected from the group consisting of A-pillars and B-pillars.

28. The air bag assembly as set forth in claim 24, wherein the air bag cushion is stored in an upper front interior corner of the vehicle, the upper front interior corner being defined by the structural member and a roof rail.

29. The air bag cushion assembly as set forth in claim 24, wherein the air bag cushion is disposed along a length of the structural member between the inner pillar sheet and the interior trim.

30. The air bag assembly as set forth in claim 24, wherein the air bag cushion includes a frontal portion and a side portion, the frontal portion and the side portion being in fluid communication with each other, whereby upon air bag deployment, the frontal portion deploys downwardly and in front of a vehicle occupant and wherein the side portion deploys downwardly and to the side of the vehicle occupant such that the air bag cushion wraps around the occupant during deployment for continuous front to side coverage.

31. The air bag assembly as set forth in claim 24, wherein the gas conduit is formed of an expandable material, wherein in a first state the gas conduit is compressed to a generally flattened state and upon inflator gas flowing therethrough, the gas conduit expands to a second state corresponding to said area defined between the inner and outer pillar sheets.

32. The air bag assembly as set forth in claim 31, wherein the gas conduit is selected from the group consisting of air bag cushion fabric conduits, coated air bag cushion fabric conduits, fire hose material conduits, compressable and expandable elongated metal conduits, rigid conduits, and compressable and expandable polymer-based conduits.

33. The air bag assembly as set forth in claim 24, further including:

a plenum surrounding the inflator for containing the generated inflator gas and directing the inflator gas to an outlet formed therein, the outlet being in fluid communication with the gas conduit so that the inflator gas flows through the outlet and into the gas conduit.

34. The air bag assembly as set forth in claim 24, wherein the gas conduit has a first end in fluid communication with the inflator and a second end in fluid communication with the air bag cushion so that generated inflator gas flows into the first end and flows through the gas conduit and into the air bag cushion.

* * * * *